United States Patent [19]

Gray

[11] Patent Number: 4,469,135

[45] Date of Patent: Sep. 4, 1984

[54] AIR ENTRAINED PARTICULATE MATERIAL VALVE

[76] Inventor: B. Martin Gray, R.R. 1, Box 13, Page, N. Dak. 58064

[21] Appl. No.: 313,467

[22] Filed: Oct. 21, 1981

[51] Int. Cl.³ .......................................... F16K 11/06
[52] U.S. Cl. .............................. 137/625.45; 137/874; 137/875; 406/156; 406/182
[58] Field of Search .................. 137/625.45, 625.46, 137/872, 874, 875, 876; 193/31 A; 251/177, 179; 406/156, 181, 182

[56] References Cited

U.S. PATENT DOCUMENTS

| | | | |
|---|---|---|---|
| 863,004 | 8/1907 | Smith | 137/625.45 |
| 1,857,643 | 5/1932 | Kinyon | 406/156 X |
| 2,360,389 | 10/1944 | Bergman | 137/625.42 X |
| 2,467,945 | 4/1949 | Pottmeyer | 137/625.4 X |
| 2,586,144 | 2/1952 | Benoit | 137/874 X |
| 2,605,076 | 7/1952 | Tanke | 137/875 X |
| 3,620,255 | 11/1971 | Stillman | 137/625.45 |
| 3,924,832 | 12/1975 | Babcock | 137/625.45 X |
| 4,019,535 | 4/1977 | Buckethal | 137/625.45 X |
| 4,157,848 | 6/1979 | Smoot | 137/874 X |
| 4,189,261 | 2/1980 | Kelley et al. | 137/874 X |

*Primary Examiner*—Gerald A. Michalsky
*Attorney, Agent, or Firm*—Kinney & Lange

[57] ABSTRACT

A valve preferably used for selectively diverting the flow of air entrained particulate material, such as cereal grains from an inlet into a selected one of a plurality of outlets. The valve has a back plate which has a plurality of outlet openings and a gate plate which has a single inlet opening. The gate plate is pivotally mounted on the back plate so that it is selectively movable to a plurality of positions wherein in each position the inlet opening is aligned with one of the outlet openings. One end of a length of flexible inlet pipe is connected to the inlet opening to permit the gate plate to pivot to each of its respective positions on the back plate while the other end of the pipe remains stationary. The gate plate and back plate are so formed to seal around the inlet and outlet openings when aligned for material flow and the plates are urged against each other to prevent leakage of material at the valve.

6 Claims, 6 Drawing Figures

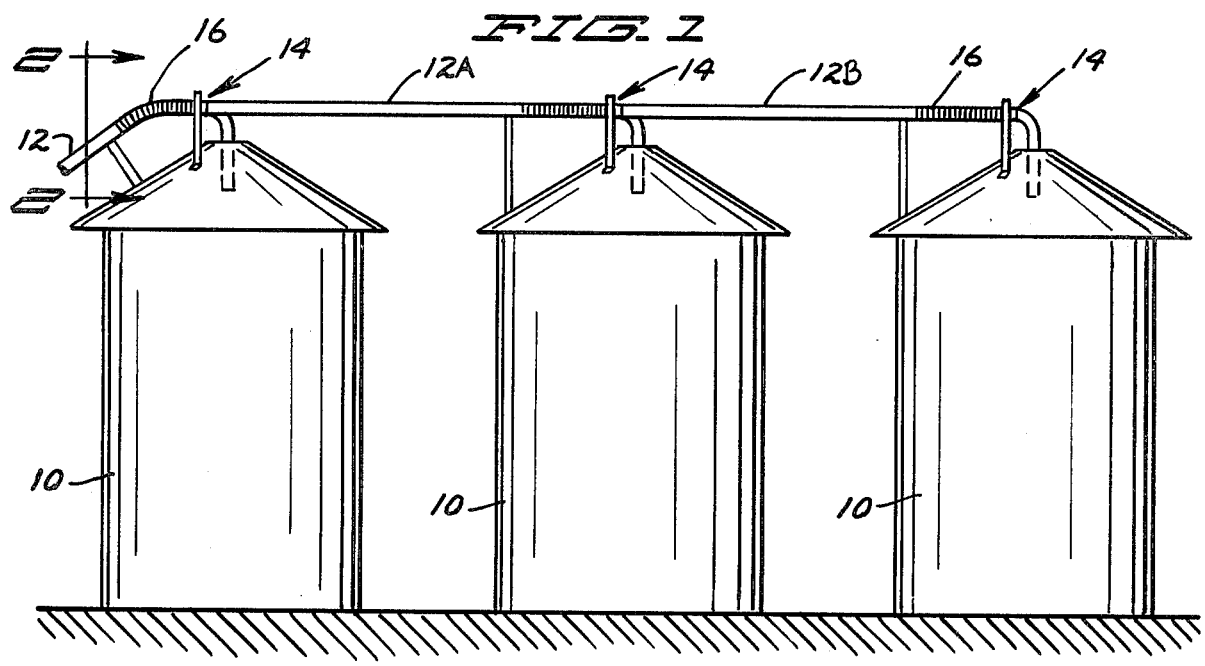
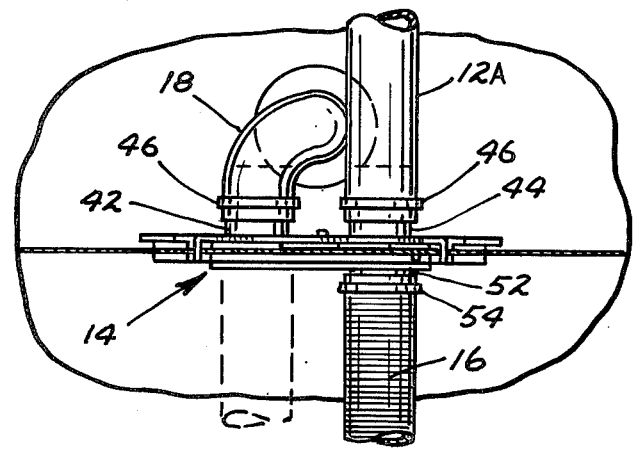
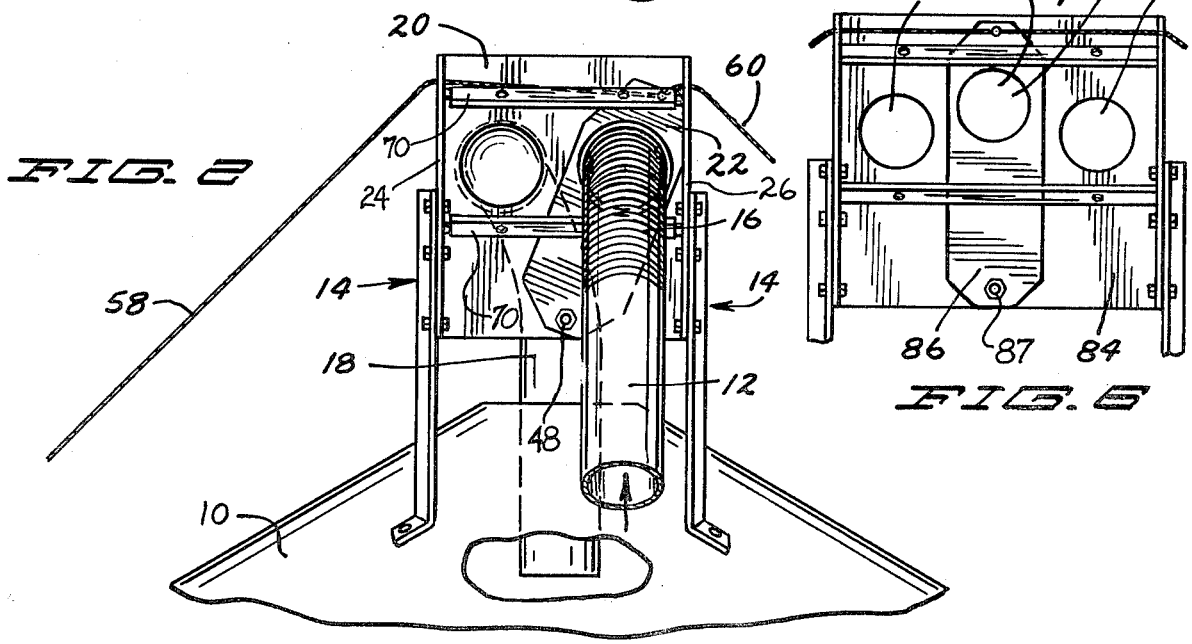

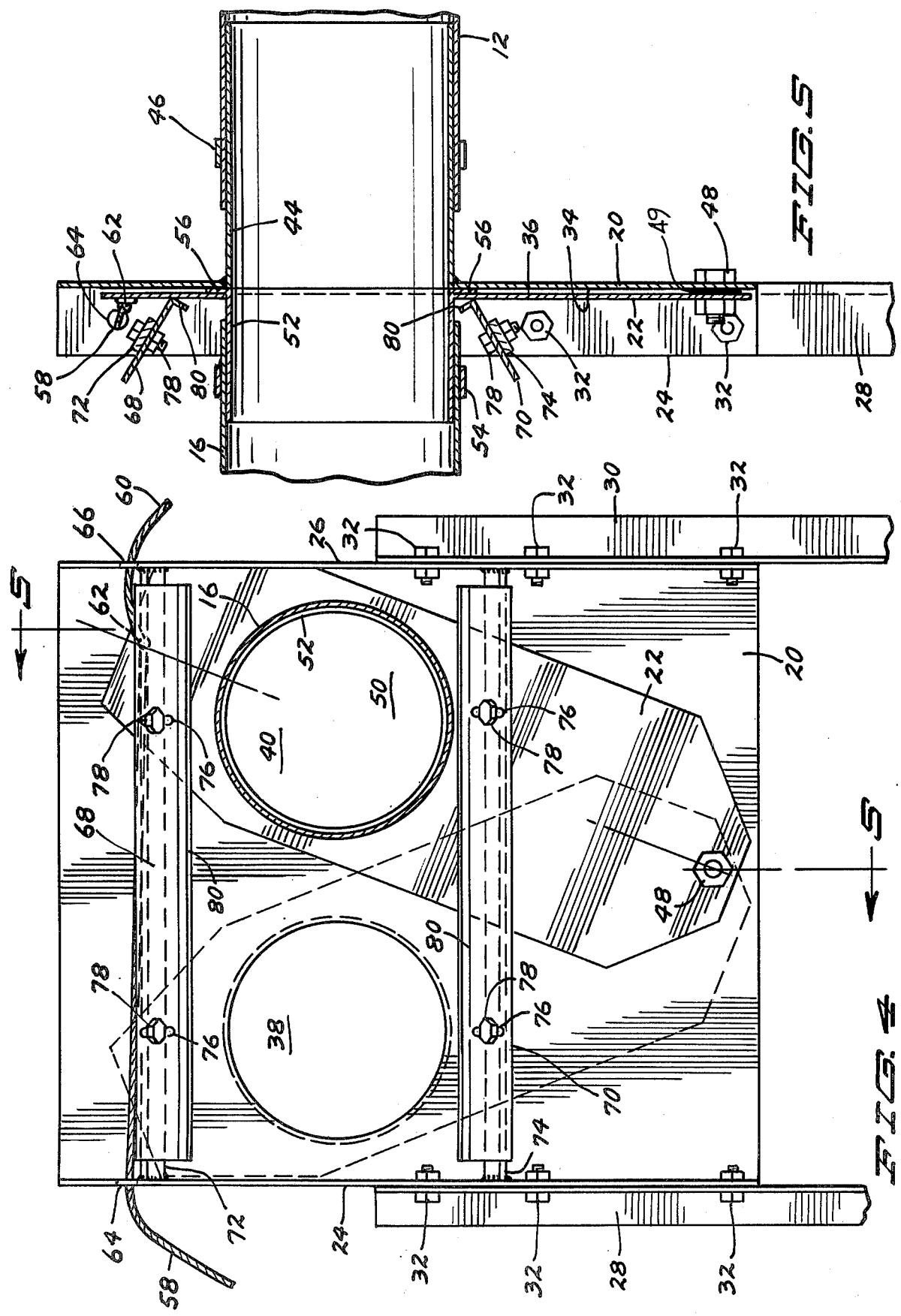

AIR ENTRAINED PARTICULATE MATERIAL VALVE

BACKGROUND OF THE INVENTION

1. Field of the Invention

The present invention relates to valves, and specifically to a valve for selectively diverting air entrained particulate material.

2. Prior Art

Various valve devices are known in the prior art. For example, U.S. Pat. No. 863,004 shows a valve for gas producers which diverts the flow of gas from a main flow tube into either a first branch tube or a second branch tube. The valve of this patent accomplishes diversion by allowing the main flow to enter into a housing wherein the flowing substance enters whichever branch tube is not sealed off by the valve. U.S. Pat. Nos. 2,605,076, 2,467,945 and 3,620,255 show valves which operate on a similar principle. To divert flow from a main flow line into one of two secondary lines in these prior art devices, it is necessary to seal off one of the secondary lines at the valve in order to force the flow into the other secondary line.

This manner of diverting flow is also employed in U.S. Pat. No. 2,360,389. The device of this patent splits the main flow line into two secondary flow lines and then seals off one of the secondary lines to divert the flow into the other. In addition, the valve of this patent can seal off both secondary lines at once to completely stop the flow.

U.S. Pat. No. 4,019,535 shows a valve device for selecting one of two intakes to carry the flow of material past the valve. As in all of the valves of the prior art mentioned, in order for one line or conduit to be open and flowing through the valve, the other one must be sealed off by the valve. One additional patent of interest is U.S. Pat. No. 3,924,832 which shows an in-line control valve.

In the prior art valves discussed above, to divert flow from a main flow line into a secondary line, it is necessary to seal off the main line outlet at the valve in order to force the flow into an outlet serving the secondary line. In the valve of the present invention, the flow is not diverted by sealing off an outlet at the valve, but rather the inlet flow line is physically moved by the valve to direct the flow into a selected secondary line.

SUMMARY OF THE INVENTION

The present invention is a valve for selectively diverting air entrained particulate material. As shown, the valve has a back plate, upon which is pivotally mounted a gate plate. The back plate has a plurality of outlet openings and the gate plate has a single inlet opening. Means for urging the gate plate and back plate against each other is also mounted on the back plate. The gate plate is pivotally mounted on the back plate so that the gate plate is selectively movable to a plurality of positions to align the inlet opening with one of the outlet openings. Attached to the inlet opening of the gate plate is one end of a length of flexible inlet pipe. The other end of the inlet pipe remains stationary while the gate plate is pivoted to its respective positions on the back plate.

The valve of the present invention is particularly useful in grain moving systems which use an air stream to carry the grain from one location to another through pipe or tubing. Grain is commonly stored in grain bins. To facilitate the loading of such bins, the valve of the present invention may be employed so that only one loading pipe is needed to transfer grain from a single unloading site to many bins. As the loading pipe passes each grain bin, a valve is positioned adjacent the bin to divert the flow of grain to a secondary pipe leading to the bin. Thus the valve of the present invention provides a simple, yet economical, means for loading grain bins from a single loading site.

BRIEF DESCRIPTION OF THE DRAWINGS

FIG. 1 illustrates a grain bin loading system employing valves of the present invention;

FIG. 2 is a front elevational view of a valve of the present invention as taken on line 2—2 of FIG. 1;

FIG. 3 is a top view of the valve of FIG. 2;

FIG. 4 is an enlarged front view of a first embodiment of the valve of the present invention having two outlet openings;

FIG. 5 is a sectional side view of the present invention as taken on line 5—5 of FIG. 4; and FIG. 6 is a front view of a further embodiment of the valve of the present invention having three outlet openings.

DETAILED DESCRIPTION OF THE PREFERRED EMBODIMENTS

FIG. 1 shows a series of grain bins 10 served by a single grain conduit pipeline 12. At each bin 10, the pipeline 12 is interrupted by a valve 14 of the present invention. Immediately upstream of each valve 14 the pipeline 12 has a flexible conduit portion 16.

In FIG. 2, a valve 14 of the present invention is shown mounted on the top of a grain bin with flexible conduit portion 16 attached at one end to the incoming pipeline and the other end of conduit portion 16 is attached to the inlet side of the valve. On the downstream side of each valve, two conduit sections emerge. One of these conduits 12A or 12B is a continuation of the grain filling pipeline 12 as shown in FIG. 3 and leads to a second and third bin. The other conduit is a secondary or branch conduit 18 which is directed into the bin 10 which the respective valve 14 serves. By operating the valve 14, the flow of grain may be directed either to the conduit portion 12A or 12B of the main conduit 12 or into the secondary conduit 18 to fill the associated bin with grain.

Each valve 14 includes a back plate 20 and a gate plate 22. The back plate has side flanges 24 and 26 as shown in FIGS. 4 and 5. These side flanges 24 and 26 are secured to legs 28 and 30 by bolts 32 in order to securely mount the valve in position for use.

As shown in FIG. 5, the back plate 20 and the gate plate 22 have mating surfaces 34 and 36, respectively, which face each other. The mating surface 34 of the back plate 20 has two outlet openings 38 and 40. Secured about the periphery of outlet openings 38 and 40 on the downstream side of the back plate 20 are mounting rims 42 and 44, respectively, which can be clearly seen in FIG. 3. These mounting rims provide means for attaching the respective conduit section 12A or 12B and secondary conduit 18 to the valve. As shown in FIGS. 3 and 5, the conduit section 12A and secondary conduit 18 are slipped over the rims 42 and 44 and secured thereto by clamps 46.

Means are provided for pivotally connecting the gate plate 22 to the back plate 20 to allow the gate 22 to be selectively movable on the back plate 20 to a plurality of positions. Preferably, the back plate 20 and gate plate 22 each have an aperture through which a pivot bolt 48 is secured. A spacer 49 is positioned on the bolt 48 between the gate plate 22 and back plate 20 and while bolt 48 secures the gate plate to the back plate, it also allows the gate plate to pivot on the back plate with their respective mating surfaces facing each other. An inlet opening 50 is defined through the mating surface 36 of the gate plate 22. Secured about the periphery of this inlet opening 50 on the upstream side of the gate plate is a mounting rim 52. This mounting rim 52 provides a means for securing one end of the flexible conduit portion 16 to the gate plate 22 of the respective valve 14. As shown in FIGS. 3 and 5, the flexible conduit portion 16 is slipped over the rim 52 and secured thereto by a clamp or other fastening means 54. The other end of the flexible portion 16 is attached to the conduit 12,12A or12B and remains stationary during material flow and valve operation.

FIG. 4 clearly shows the relationship of the gate plate 22 and the back plate 20 as pivotally connected by the pivot bolt 48. A gasket 56 (as shown in FIG. 5) is positioned between the two mating surfaces 34 and 36 of the back plate and gate plate to seal the peripheries of the openings in the plates from leakage. Gasket 56 is preferably secured to the mating surface 36 of the gate plate 22 and slides with it as it is pivots on the back plate 20.

In the embodiment of the invention illustrated in FIG. 4, the gate plate 22 has two operating positions. In each of those positions, the inlet opening 50 on the gate plate 22 and the outlet openings 38 and 40 on the back plate 20 are positioned such that the inlet opening and one outlet opening may be selectively aligned to allow material flow from the upstream portion of the conduit 12 to the either the downstream conduit section 12A or the secondary pipe line 18. In FIG. 4, the gate plate 22 is shown with inlet opening 50 aligned with outlet opening 40 to allow material to flow through the valve 14 into conduit section 12A or 12B. FIG. 4 also shows (in dotted lines) the gate plate in position to direct the material flow into outlet opening 38 and secondary conduit 18.

The gate plate 22 is formed to alternatively abut the side flanges 24 and 26 of the back plate 20 to align the inlet and outlet openings for material flow. The position of the gate plate 22 on the back plate 20 is controlled by means of ropes or cables 58 and 60. These cables are attached to the upper end of the gate plate 22 by an attachment means 62 and pass through the side flanges 24 and 26 of the back plate 20 at apertures 64 and 66.

Means for urging the gate plate and back plate together are provided, preferably in the form of a pair of spring bars 68 and 70 which urge the mating surface 36 of the gate plate 22 toward the mating surface 34 of the back plate 20 and thus against the gasket 56 to prevent leakage at the valve. Spring bars 68 and 70 are mounted on supports 72 and 74, which in turn are rigidly secured to side portions 24 an 26. The supports are parallel to and spaced from the back plate and the gate plate is between the bars and the back plate. Spring bars 68 and 70 have slots 76 for slidably accepting bolts 78 to adjustably secure the spring bars to the support bars 74 and 72. Each spring bar has a lip 80 which is positioned so that a portion of the lip 80 is contiguous with the gate plate 22 to resiliently urge it against the back plate 20 across the entire range of movement of the gate plate. The amount of force exerted by spring bars 68 and 70 on the gate plate 22 is determined by varying the position of the spring bars relative to the supports by means of the slots 76 and bolts 78.

Also, coil springs can be used under the nuts on bols 78 to spring load the spring bars 68 and 70 against the supports 72 and 74 and against the gate plate. The coil springs aid in controlling the spring force exerted on the gate plate to insure adequate force is provided, and binding of the gate plate is avoided because the coil springs will accommodate irregularities readily.

In operation, the valve of the present invention may be selectively positioned to divert air entrained particulate material from one upstream conduit into one of a plurality of downstream conduits relative to the valve. Valve 14, with its gate plate 22 in the position as shown in FIGS. 2 and 3 directs the flow of material from the flexible portion 16 to the conduit section 12A or 12B, or in other words, is set to convey material to the next valve in series. To divert flow into the secondary conduit 18 of that particular valve, cable 58 is pulled to pivot the gate plate 22 relative to the back plate 20 to the left (as in FIGS. 2 and 4) to abut side flange 24 and align the inlet opening 50 with the outlet opening 38. The flexible conduit portion 16 attached to the inlet opening 50 will flex to permit the movement of the gate plate 22 and thus allows material to flow from the inlet conduit such as pipeline 12 into and through the valve 14 to secondary conduit section 18 and into the associated grain bin 10.

Once the bin has been filled to the desired level with material, the gate plate 22 is pivoted by pulling on cable 60 to abut the side flange 26 and align the inlet opening 50 with the outlet opening 40. In this position, material may flow through the valve into conduit section 12A or 12B. At all times during the flow of material through the valve 14 and also during the pivoting of the gate plate 22 on the back plate 20, the gate plate 22 is urged against the back plate 20 by the spring bars 68 and 70. This applied sealing force, along with the use of the sealing means 56, provide for a leak-free valve.

A further embodiment of the valve of the present invention is illustrated in FIG. 6. In this embodiment, a valve 82 is adapted to direct the material flow from a single upstream conduit into more than two downstream conduits. This results in further efficiency and economy through the use of such valves in moving grain by enabling close placement of grain bins and necessitating only one pipeline or conduit to feed the system. Valve 82 has a back plate 84 and a gate plate 86 mounted thereto by a pivot bolt 87 similar to those of the previously described embodiment. The gate plate 86 has a single inlet opening 94 shown aligned with outlet opening 90. However, back plate 84 has three outlet openings 88, 90 and 92. Inlet opening 94 is selectively aligned with outlet openings 88, 90 or 92 to allow flow into downstream conduits connected to those outlet openings by pivoting the gate plate 86 on the back plate 84 in the same manner as previously described.

The surface of gasket 56 forms a surface means on the plate carrying the gasket that is contiguous with the surface of the other plate as the plates slide relative to each other.

Although the present invention has been described with reference to preferred embodiments, workers skilled in the art will be recognize that changes may be made in form and detail without departing from the spirit and scope of the invention.

What is claimed is:

1. A valve adapted for mounting on the roof of a building structure such as a grain bin for selectively diverting air entrained particulate material, the valve comprising:

a back plate having a first surface and a pair of flanges on the sides thereof, and a plurality of outlet openings defined therethrough;

a gate plate having a surface facing said first surface and an inlet opening defined therethrough, the surfaces of the back plate and gate plate mating with each other with the gate plate positioned between the flanges;

means for pivotally connecting the gate plate to the back plate so that the gate plate is selectively movable to a plurality of positions wherein in each position the inlet opening is aligned with one of the outlet openings;

a length of flexible inlet conduit, one end of the conduit being connected to the inlet opening to permit the gate plate to pivot to its respective positions while the opposite end of the conduit remains stationary; and means for urging the surfaces of the gate plate and the back plate toward each other comprising a support and a spring bar mounted on the support, the support being secured at its ends to the side flanges and being parallel to and spaced from the back plate, the gate plate being positioned between the support and the back plate, and the spring bar resiliently bearing against the gate plate.

2. The valve of claim 1 and gasket means positioned between the mating surfaces of the gate plate and back plate and surrounding the inlet opening.

3. The valve of claim 1 wherein the spring bar is slidably mounted on the support and is adjustable for selectively varying the amount of pressure exerted by the spring bar on the gate plate.

4. The valve of claim 3 wherein the gate plate is so formed to abut each of the side flanges alternatively when the gate plate inlet opening is aligned with one of the back plate outlet openings for material flow.

5. The valve of claim 4 further comprising two control cables secured to the gate plate, each control cable passing throug a separate aperture in each of the side flanges so that when one of the control cables is pulled the gate plate is moved to one of its operative positions.

6. The valve of claim 3 wherein the means for urging further comprises a second support having a second spring bar selectively mounted thereon to further urge the gate plate toward the back plate.

* * * * *